(12) United States Patent
Djuricic et al.

(10) Patent No.: US 7,767,292 B2
(45) Date of Patent: Aug. 3, 2010

(54) FIRED, FIRE-RESISTANT CERAMIC PRODUCT

(75) Inventors: Boro Djuricic, Leoben (AT); Bernd Buchberger, Trofaiach (AT); Klaus Santowski, Frohnleiten (AT); Franz Koeck, Kulm am Zirbitz (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 393 days.

(21) Appl. No.: 11/913,076

(22) PCT Filed: Mar. 22, 2006

(86) PCT No.: PCT/EP2006/002622

§ 371 (c)(1),
(2), (4) Date: Oct. 30, 2007

(87) PCT Pub. No.: WO2007/006350

PCT Pub. Date: Jan. 18, 2007

(65) Prior Publication Data

US 2008/0160279 A1 Jul. 3, 2008

(30) Foreign Application Priority Data

Jul. 11, 2005 (DE) .................. 10 2005 032 254

(51) Int. Cl.
*B32B 3/26* (2006.01)
(52) U.S. Cl. .............. 428/314.2; 428/312.2; 428/312.8; 428/315.5
(58) Field of Classification Search ........................ None
See application file for complete search history.

(56) References Cited

U.S. PATENT DOCUMENTS

| | | | |
|---|---|---|---|
| 4,579,829 A | 4/1986 | Garvie | |
| 5,124,287 A | 6/1992 | Wehrenberg | |
| 5,217,930 A | 6/1993 | Dubots et al. | |
| 5,407,873 A | 4/1995 | Goerenz | |
| 5,407,875 A | 4/1995 | Petschauer et al. | |
| 5,705,118 A * | 1/1998 | Hayes et al. | 264/656 |

2002/0103070 A1 8/2002 Toshihiro

FOREIGN PATENT DOCUMENTS

| | | |
|---|---|---|
| DE | 4091550 T1 | 10/1991 |
| DE | 4243538 A1 | 6/1994 |
| DE | 19727649 A1 | 1/1999 |
| DE | 19941610 C1 | 4/2001 |
| JP | 59213669 A | 12/1984 |
| JP | 8290958 A | 11/1996 |
| WO | 01/25165 A | 4/2001 |

OTHER PUBLICATIONS

Aksel C.,et al.,"The influence of zircon in a model aluminosillicate glass tank forehearth refractory", Journal of the European Ceramic Society, Elsevier Science Publisers, Barking, Essex, GB, vol. 23, No. 12 Nov. 2003, pp. 2083-2088.
A.B. Sibikin et al., "Effect of the Structural Parameters of Refractories on their Slag Impregnation in the Units Used for Vacuum Refining of Steel," (translated from Ogneupory, No. 10, pp. 1-7, Oct. 1990), Scientific Research, Plenum Publishing Corporation, pp. 543-549, 1991.
Kazuo Itoh et al., "Application of Slide Gate Plate for Tundish formed by Hot-Press," Taikabutsu 47 [10], pp. 517-518, 1995.
John Y. Lui et al., "Refractories for Aluminum Salt Bath Applications," Ceram. Eng. Sci. Proc., 9 [1-2], pp. 43-60, 1998.
Andres Eduardo Pinto, "Attack of Flouride Molton Glass on Refractory Materials," Unitecr '93 Congress, Sao Paulo, Brazil, pp. 1162-1173.
Takashi Okada et al., "Low-Flux Magnesia-Chrome Brick for Tuyeres in AOD Vessels," Taikabutsu 48 [11], p. 601, 1996.
Shoichi Tanaka et al., "Studies on the Micro Pore Distribution of Zircon Brick," Taikabutsu, 44 [11], p. 670, 1992.
N. Iwasaki et al., "Corrosion Resistance of Burned High Alumina Ladle Bricks," Taikabutsu 43, [12], pp. 674-675, 1991.
V.V. Kolomeitsev et al., "Structure and Properties of Ceramics of the System Al2O3-ZrOz-SiO2," (translated from Steklo I. Keramika, [6], pp. 22-24, Jun. 1992), In Factories and Institutes, Plenum Publishing Corporation, pp. 293-297, 1992.
G. Routschka, "Investigation of the Influence of Particle Size Distribution on the Pore Size of Refractory Bricks," Keramische Zeitschrift, vol. 46, pp. 536-540, 1994.

* cited by examiner

*Primary Examiner*—Ling Xu
(74) *Attorney, Agent, or Firm*—Christopher L. Parmelee; Walker & Jocke

(57) ABSTRACT

The invention relates to a fired, fire resistant (refractory) ceramic product.

13 Claims, 7 Drawing Sheets

FIRED, FIRE-RESISTANT CERAMIC PRODUCT

The invention relates to a fired, fire-resistant (refractory) ceramic product. This includes products which are produced from zirconium silicate of varying purity, e.g. from natural zirconium silicate ($ZrSiO_4$). The following production processes are known:

Zirconium silicate is sintered, subsequently ground and the pre-fired, ground product is subsequently moulded with the addition of a binder and fired once more. The multi-stage and consequently time-consuming and expensive manufacturing process is a disadvantage. These products are not sufficiently dense and corrosion-resistant for use in the glass industry (lining of furnace ends).

Moulded parts are cast from $ZrSiO_4$ suspensions. Such products do not exhibit satisfactory product properties. In particular, the mechanical properties, such as thermal shock resistance, are frequently unsatisfactory.

Fired products based on zirconium silicate are used in particular for lining glass smelting ovens. They usually have a low resistance to temperature changes and a high corrosion resistance vis-à-vis the glass melt. The zirconium products are produced with as high a bulk density as possible (>4 $g/cm^3$).

The best bricks based on zirconium silicate available on the market at present have a bulk density of approximately 4.4 $g/cm^3$ and an open porosity of <1 vol. %. Apart from zirconium silicate, they contain: secondary components such as $Al_2O_3$, $TiO_2$, $HfO_2$ and $Y_2O_3$.

Although it can be expected that ultra-pure zirconium silicate products of a high density provide particular advantages for use in glass melting ends, difficulties arise during production due to the high sinter temperature necessary for such products. It has been found that at temperatures above 1,650° C., in some cases below that, a thermal decomposition of the zirconium silicate into $ZrO_2$ and $SiO_2$ occurs.

To achieve as high a bulk density as possible, different sintering aids, such as MgO, ZnO, $Al_2O_3$ and $TiO_2$, have thus been added to the zirconium silicate raw material.

The actual requirements regarding zirconium products suitable for lining glass melting ends (tanks) can be summarised as follows:

A porosity as low as possible, a proportion of open porosity as low as possible, a high bulk density.

The above-mentioned zirconium product, which is the best offered on the market at present and which is described in further detail at the end of this specification, satisfies these properties. At elevated temperatures of the glass melt (>1, 600° C.) exudation of melt phase from the product takes place in the case of this product. This results in the brick matrix consisting in parts only of zirconium silicate grains arranged in a skeleton-type arrangement, as a result of which glass melt can infiltrate inside leading to a destruction of the fire-resistant material. At the same time, contamination of the glass melt by dissolved and non-dissolved components of the fire-resistant material occurs. This is not acceptable in general and specifically not for glass melts for the production of high value glasses, in particular optical types of glass.

A further disadvantage of the known zirconium products is their low resistance to thermal shock. If a crack is formed in the brick, this propagates rapidly and destroys the brick structure. Overall, the known bricks have to be qualified as being extremely brittle. This leads to premature wear and tear as a result of detachments or cracking. This is associated with loss of production and costs.

Fire-resistant ceramic products based on aluminium oxide ($Al_2O_3$) or combinations of $Al_2O_3$ and $ZrO_2$ are also used for the above-mentioned applications in glass melting ends.

The invention is based on the object of providing a fire-resistant ceramic product which can be used for lining glass melting ends, in particular glass melting ends for the manufacture of high value types of glass. These include among others: optical types of glass, types of glass resistant to high temperatures, in particular pure types of glass. In this connection, the product should exhibit cumulatively as many of the following properties as possible: a resistance to high temperatures, a good resistance to thermal shock, an advantageous corrosion behaviour, a certain structural elasticity. Moreover, contaminants of the glass melt should be prevented as far as possible in the contact area between the firing material and the glass melt.

Extensive tests have been carried out to achieve this object. The following findings were obtained from them:

Apart from the chemical composition, the microstructure of the fired product, in particular, plays a decisive part. Consequently, an attempt was made to optimise the porosity and pore size as well as the pore size distribution.

The raw materials for producing a product according to the invention are largely processed to make them finely divided and subsequently made granular. During firing (pyroprocess), the formation of a structure occurs in which the individual granules disappear; however, the original granular structure is still mostly discernible even in the fired product. In this connection, it was found that the structural build up, in particular in the area between the (original) granules, is capable of exerting a particular influence onto the product properties (in particular the product properties of moulded products such as bricks).

Accordingly, the invention relates, in its most general embodiment, to a fired, fire-resistant ceramic product whose structure exhibits the following properties:

an open porosity of 2 to 30% by volume, more than half of the open porosity consists of pores whose maximum diameter is, on the one hand, 15 µm and which, on the other hand, are situated within a pore size interval whose maximum value is ≦10 times the minimum value.

Consequently, the pore size and the pore size distribution represents an essential characteristic. The predominant part of the pores (>50% of the total open pore volume) should be within a small pore size interval ("pore band"). Within the above-mentioned pore range of >0 µm to ≦15 µm, upper limit values of 10 µm, 8 µm, 7 µm or 5 µm are possible. The lower limit may be 0.1 but can also be 1 or 2 or 3 µm. As a rule, the lower limit will be at least 0.2 or 0.5 µm. Insofar as the upper limit is above 5 µm, the lower limit can also be selected at 5 µm. Typically, a large proportion of the pores is in the region of 0.5 to 5 µm or 1 to 5 µm or 0.8 to 8 µm or 1-10 µm.

According to definition, the pores relevant to the invention relate to a pore size interval/pore band in the case of which the largest pore detected has a size which is ≦10 times the size of the smallest pore in this interval, i.e. to the following pore size intervals, for example: 0.2 to 2 µm, 1 to 10 µm or 4-14 µm.

The proportion of such pores of the total open porosity is more than 60%, more than 70%, but also more than 80% depending on different embodiments.

The pore sizes and pore size distribution outside the proportion defined according to the invention (in the following also referred to as "microporosity") are not critical. These "residual pores" may have pore diameters of up to 400 µm ("macroporosity"), for example. In a product in the case of which 60% of the open pores, for example, are in the region of 1 to 10 µm, other open pores may have a diameter of <1 µm.

In particular in the case of products made of $Al_2O_3/ZrO_2$ materials, it has been found that, below the lower limit value for the accumulation range of open pores important for the invention (1-10 µm in this case, for example) a second accumulation range may occur. If the pore diameters are plotted as a function of the relative open porosity in %, a second "peak" is obtained in a second pore size interval to which, again the fact applies that the maximum value is smaller than or equal to 10 times the minimum value, i.e. 0.05 to 0.5 µm or 0.08 to 0.8 µm, for example (in the following also referred to as "nanoporosity"). The proportion of this nanoporosity (within the range of the macroporosity) is typically $\leqq 20\%$ of the open total porosity, but can also amount to $\leqq 40\%$ or $\leqq 45\%$.

In other words: the greater number of pores (diameter $\leqq 15$ µm, preferably $\leqq 10$ µm) in a pore size range which is as narrow as possible (pore band) the more advantageous is the influence on the product properties. This applies in particular to the resistance to corrosion and the resistance to temperature variations but also to the compressive strength in the cold before and after temperature treatment.

The open porosity may amount to 4 to 30% by volume, depending on the embodiments, to up to 25% by volume, up to 20% by volume or up to 18% by volume, with lower limits of alternatively 5% by volume, 8% by volume or 14% by volume. The grain size (fine division) of the batch components, the size and density of the granules produced therefrom, the conditions of processing into moulded bodies and the subsequent firing influence the pore size and the pore size distribution. By slow heating (e.g. 10-25° C./h) and/or retention times at certain temperatures (e.g. 4 h at 200° C., 400° C. and 700° C. in each case), the formation of pores of <15 µm can be enhanced.

For products based on zirconium silicate, the following applies: it may be advantageous if zirconium dioxide ($ZrO_2$) is formed as secondary phase in the structure in situ during firing. In other words: The structure exhibits $ZrO_2$ grains formed in-situ during firing. The structure may contain $ZrO_2$ in a monoclinic crystal structure. Such $ZrO_2$ granules which are subsequently divided more or less homogeneously in the structure (in the microstructure) promote the advantageous ductile properties of the zirconium product. They improve in particular the structural elasticity. This applies in particular if the zrOz granules are present in the structure individually; i.e. at a distance to each other. The distance between adjacent $ZrO_2$ particles should in every case be larger than the particle itself. The distance of adjacent $ZrO_2$ particles may be 3 to five times but also more than 10 times the largest diameter of such a particle. The $ZrO_2$ particles are consequently present like islands in the structure. Their proportion and the size of the $ZrO_2$ particles depend, among other things, on the purity of the raw material and the firing temperature. $ZrO_2$ is formed in particular if chemical contaminants in the batch which react with $SiO_2$ or form solid solutions with zirconium silicate and/or silica permit the thermal decomposition of the $ZrSiO_4$ at elevated temperatures. The quantity of $ZrO_2$ formed can be influenced, among other things by the thermal treatment (firing temperature, firing duration) and the quantity and type of the secondary components of the $ZrSiO_4$.

It has, moreover, been found that certain additives, in particular oxides such as $TiO_2$, $BaO$, $Y_2O_3$ and $P_2O_5$, as a function of their proportions by mass (absolute and relative to each other), are responsible for improved product properties.

The weight ratio of $ZrSiO_4$ to $ZrO_2$ in the fired product is commonly between 80:20 and 98:2, usually between 85:15 and 95:5.

It has proved to be advantageous if firing (the pyroprocess) is carried out in such a way that free $ZrO_2$ grains which have a diameter of e.g. $d_{90}<10$ µm are formed in the matrix. These grains frequently occur in groups within the structure. The islands thus formed of several $ZrO_2$ granules have a shape which, with respect to their cross-section, can be referred to as worm-type or finger-type (compare "Z" in FIG. 2a). However, sometimes, the individual $ZrO_2$ particles have grown together to form non-specific three-dimensional agglomerates whose largest "diameter" may be more than 50 µm. These $ZrO_2$ islands arranged at a distance to each other optimise the microstructure of the overall structure with respect to the desired product properties.

In this way, the zirconium product according to the invention differs from the state of the art based on pure zirconium silicate mentioned in the introduction to the description already with respect to at least two structural properties. The proportion of the open porosity is substantially greater; the pore sizes are relatively small and situated within a narrow pore size range. In the case of the known zirconium product mentioned in the beginning, the pores are distributed more or less evenly over a pore size range between 15 and 500 µm. Reference is made to the details given at the end of this description and the corresponding figures.

Figure 1:
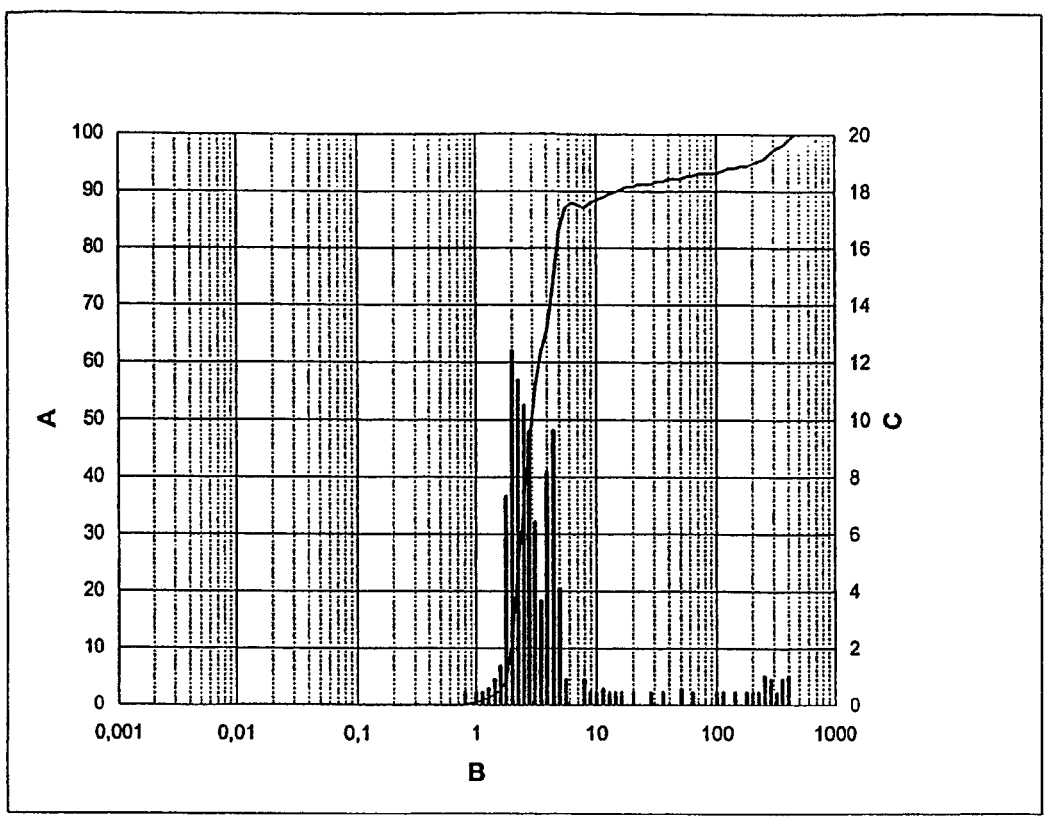
FIG. 1 shows a diagram of pore size distribution of a tested product.

Within the framework of the preliminary tests mentioned, the following optimisations have been made:

The bulk density of a zirconium product should be >3.2 g/cm$^3$, in particular $\geqq 3.8$ g/cm$^3$. Insofar as the zirconium product has a bulk density of between 3.8 and 4.1 g/cm$^3$, product properties which are broadly advantageous can be achieved if more than 70%, preferably more than 80% of the open pore volume of pores with a maximum diameter of <5 µm are formed.

In the case of zirconium products with a bulk density of more than 4.1 g/cm$^3$, the maximum diameter of the major part of pores is broadly speaking smaller, e.g. <4 µm or <3 µm. The invention also comprises zirconium products with a bulk density of >4.3 g/cm$^3$.

According to one embodiment, the structure of the zirconium product consists of granule-type structures with a diameter of up to 5 mm, these being based on the granules in the batch (consisting of finely divided $ZrSiO_4$ powder: particle size <50 µm, preferably <30 µm or <10 µm with an admixture of a sinter aid). The firing temperature is usually between 1,550 and 1,600° C. The application temperature may be higher.

The above description regarding the pore size and pore size distribution applies also to products made of other types of material. These include products based on $Al_2O_3$. The aluminium oxide in the raw material batch (e.g. as tabular alumina or corundum, calcined alumina) has an initial grain size of $\leq 100$ μm, for example (frequently: <50 μm, also with proportions of <20 μm). This material in powder form is subsequently granulated with an addition of a binder solution, e.g. polyvinyl alcohol (desired grain size 1-5 mm), moulded to form moulded parts (compression pressure: e.g. 100-200 MPa) and fired, e.g. at 1,600-1,750° C. "Slit-type pores", which will be described in further detail below, in the contact area of adjacent granules can be promoted by a constant rate of heating of e.g. 10-25° C./h up to the maximum temperature.

This applies essentially in an analogous manner to products based on a $Al_2O_3+ZrO_2$ with the following particularities: the proportions by mass of $Al_2O_3:ZrO_2$ are typically between 75:25 and 98:2. It is advantageous if both oxides are introduced into the batch in different grain sizes. $ZrO_2$ is preferably the finer material. As an example, $ZrO_2$ is used with a grain size $d_{90} \leq 8$ μm or $\leq 2$ μm, $Al_2O_3$ with a grain size of $d_{90} > 10$ μm (up to 100 μm). In this way, the pore sizes and the pore distribution are optimised. The smaller $ZrO_2$ particles can fill the interstices between the larger $Al_2O_3$ particles. The pyroprocess can be designed in such a way that tetragonal $ZrO_2$ is converted into monoclinic $ZrO_2$. During this process, microcracks are initiated within the $Al_2O_3$ structure matrix since monoclinic $ZrO_2$ has a volume approximately 3% larger than the tetragonal form. These microcracks lead to pores with diameters in the region of $\leq 15$ μm up to the nanoporosity already mentioned. During this process, the above-mentioned second frequency interval of nanopores is also formed in the area of $\leq 15$ μm ($\leq 10$ μm) which is essential according to the invention (compare FIG. 8). As a result, a crack propagation in the fired product is reduced as a result of the interaction with the first pore frequency interval and pores of >15 μm. The ductility of the product is improved. The behaviour during temperature shock is as expected.

As detailed, the pores can be divided into several classes: the major part is within a very narrow pore band with a small pore size ("microporosity"); within this microporosity, agglomerations of very small pores (nanopores) may occur. In addition, there are larger pores which include "split-type pores" as detailed below.

The ductility of the product is influenced advantageously if slit-type (surface type) pores ("S" in FIG. 2b) with a ratio of length or width: diameter (height)>1, preferably >7, >10 or >30 are formed in the boundary area of the granular structures. This can be achieved by a different green density of the granules and/or by controlling the firing process, among other things. These "surface or split type pores" can be described as flat spaces with a relatively large surface area which extends along (on) the granule surface. These pores create a distance between adjacent grain surfaces. Their length and width can amount to several 100 μm, typically 250 to 700 μm. The "diameter" i.e. the distance between opposite boundary surfaces, is usually <100 μm, typically 5 to 40 μm. They can make up 5-20% of the open porosity.

The size and shape of these pores can be adjusted by the corresponding optimisation of the size of the granules on the one hand in relation to the firing temperature on the other hand. Further possibilities for adjusting these slit-type pores between adjacent grain boundaries in a controlled manner consist of varying the fineness of the powder from the granules are formed. Other possibilities for forming the above-mentioned pores in a controlled manner are: changing the strength of the granules during preparation, varying the thickness of the granules, changing the temperature development during firing, changing the firing temperature.

Although these structural defects between the granular structures increase the overall porosity of the product, they enhance the positive influence on the structural elasticity of the brick and are consequently expressly accepted, in contrast to the state of the art.

Apart from these physical parameters, the product according to the invention can be adjusted additionally or in a controlled manner via its chemical composition.

As an example, the invention comprises products of
zirconium silicate ($ZrSiO_4$)
$ZrSiO_4+ZrO_2$ [80:20 to 98:2]
$Al_2O_3$
$Al_2O_3+ZrO_2$ [75:25 to 98:2]
$Cr_2O_3$
$Cr_2O_3+ZrO_2$ [80:20 to 96:4]
$Cr_2O_3+TiO_2+ZrO_2$ [80:10:10 to 94:4:2]
$MgO+Cr_2O_3$ [70:30 to 30:70]
$MgO$
$MgO+Al_2O_3$ [90:10 to 10:90]
$Al_2O_3+SiO_2$ [72:28 to 78:22]

The [ ] contain typical proportions by mass in the batch. Secondary components (up to 10 M %) are possible.

The following applies to a zirconium product: apart from the usual secondary components in a zirconium silicate material, in particular $Al_2O_3$, $TiO_2$, $HfO_2$, it was found that BaO, $Y_2O_3$ and $P_2O_5$ in particular, are capable of positively influencing the product properties.

These oxides can be admixed in a controlled manner insofar are they are not part of the zirconium silicate used.

The overall proportion of $TiO_2$, BaO, $Y_2O_3$ and $P_2O_5$ may amount to as much as 2.5 mass %, a proportion of 1.0 mass % being advantageous. The proportion of $P_2O_5$ may amount to as much as 0.05 mass %.

According to one embodiment, the ratio of BaO to the sum total of $Y_2O_3+Al_2O_3+HfO_2+TiO_2$ amounts to between $2.5 \cdot 10^{-2}$ and $4 \cdot 10^{-2}$, in particular between $2.5 \cdot 10^{-2}$ and $3.5 \cdot 10^{-2}$.

The ratio of the sum total of the oxides $BaO+TiO_2+Al_2O_3+Y_2O_3+HfO_2$ to $P_2O_5$ may be between 50 and 300, in particular between 65 and 250.

The adjustment of the secondary components makes it possible to produce zirconium products according to the invention with a bulk density of up to 4.4 g/cm$^3$ at firing temperatures up to 1,600° C. The proportion of $SiO_2$ originating from the thermal decomposition of $ZrSiO_4$ should also be taken into consideration. The following proportions of raw materials may be advantageous in particular for achieving higher bulk densities for the fired product:

Zirconium silicate powder with a grain fraction of <30 μm, including 30% by weight <10 μm or
zirconium silicate powder with a grain size <10 μm.

The fired product specified below (total firing time: frequently 100 to 250 hours, including 2-20 h at maximum temperature) satisfies the requirements put forward and exhibits the following properties, for example:

A corrosion test according to ASTM C 621-84 was carried out although specimens with the dimensions of 120×25×13 mm were used. The test temperature was 1,550° C., the holding time was 260 hours. In a static test, the specimens were immersed to a depth of 60 mm into a borosilicate melt with the following composition: $SiO_2$: 80.5, $Al_2O_3$: 2.5, $(Na+K)_2O$: 4.0, $B_2O_3$: 11.5, others 1.5 (all values in mass %). The corrosion was determined at two points on the immersed specimen a) on the surface of the glass melt and b) 30 mm below the surface of the glass melt. In this case, a product according to the invention was compared with the known zirconium silicate product mentioned at the beginning. In the case of the known product, exudation of melt phase in the form of beads occurred on the brick surface and a clearly discernible corrosion. The product according to the invention does not exhibit any such phenomena. It is consequently suitable in particular for use in glass melting ends for the production of optical types of glass in the case of which contaminations need to be avoided as far as possible.

A further test regarding the pressure flow (according to DIN EN 993-9) was carried out between the above-mentioned comparative products. The data determined were up to 50% lower for the product according to the invention than those for the product according to the state of the art. The cause of this is likely to be the specific structural composition of the product according to the invention.

A further comparative test was carried out regarding the thermal shock behaviour (according DIN 51068). While large cracks appeared in the product according to the state of the art after only two temperature changes, the product according to the invention was crack-free after two temperature changes under the same experimental conditions. After seven temperature changes, the known product was completely destroyed. Although cracks were detected in the product according to the invention, a destruction occurred only after $\geq 10$ temperature changes. In this case, too, the structural composition described and the resulting physical properties are decisive for the fact that more energy can be absorbed. Fewer and smaller cracks are formed than in the state of the art. The structure is considerably "more flexible" in the case of product according to the invention than in the case of the known product. The corresponding measurements are carried out using the wedge splitting test as described in PCT/EP2005/002226. This document has been publicly accessible since 24.06.05 via the library of the Institut für Gesteinshüttenkunde at Montanuniversität Leoben, address: Peter-Tunner-Straße 5, A-8700 Leoben.

By further optimisations, a zirconium product was obtained whose structure exhibits the following oxide analysis (in mass %):

$ZrO_2$: 62-65
$SiO_2$: 32-34
$Al_2O_3$: 0.5-1.5
$TiO_2$: 0.5-2
$HfO_2$: 0.6-1.5
$Y_2O_3$: 0.1-0.5
BaO: 0.03-0.3
$P_2O_5$: 0.01-0.05
$Fe_2O_3$: 0.01-0.1

Further oxides such as $Na_2O$, MgO, $K_2O$, CaO, $V_2O_5$, $Cr_2O_3$, MnO, NiO are possible in proportions of <0.1 mass % respectively.

The production of the tested zirconium product is, as an example, as follows:

Zirconium silicate powder (<30 μm) is processed by means of a sintering aid ($TiO_2$) into granules (diameter 3-5 mm) and subsequently compressed at a compression pressure of 150 MPa into a moulded part and fired at 1,580° C. The physical properties of the product are as follows:

Bulk density: 3.8 g/cm³
Open porosity: 17% by volume

The following data have been determined for other products according to the invention:

Bulk density: 4.1 g/cm³
Open porosity: 9% by volume
or
Bulk density: 4.3 g/cm³
Open porosity: 5% by volume Regarding the pore size distribution of the tested product: compare FIG. 1. The diagram shows the pore diameter in μm on the abscissa, the open porosity in relative % on the ordinate, both in the histogram (bars) representation and as a summary curve.

Figure 2A:
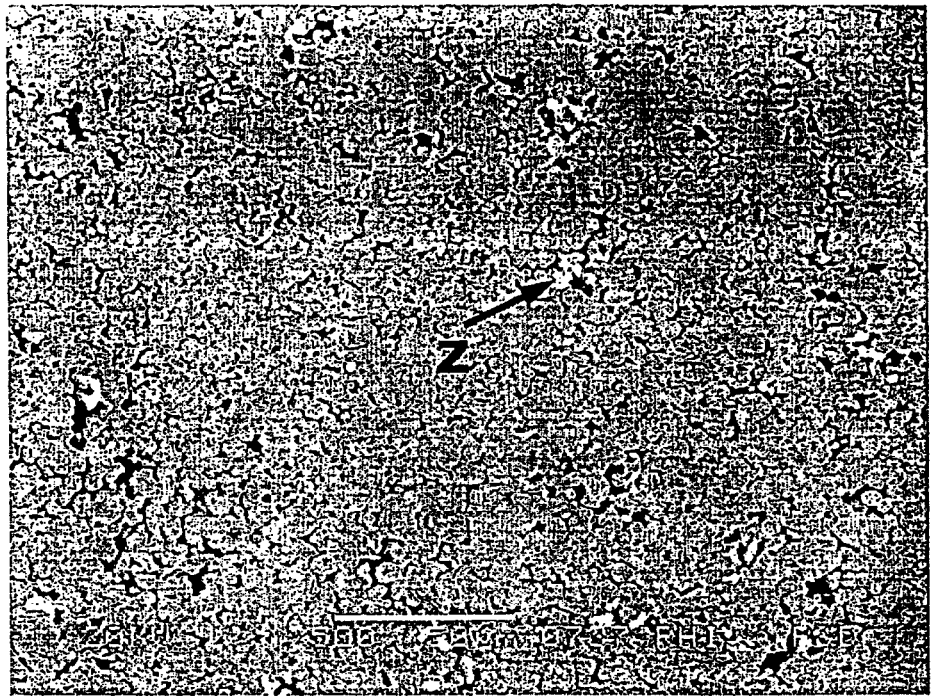
FIG. 2a shows a structure with islands formed of several $ZrO_2$ granules.
Figure 2B:
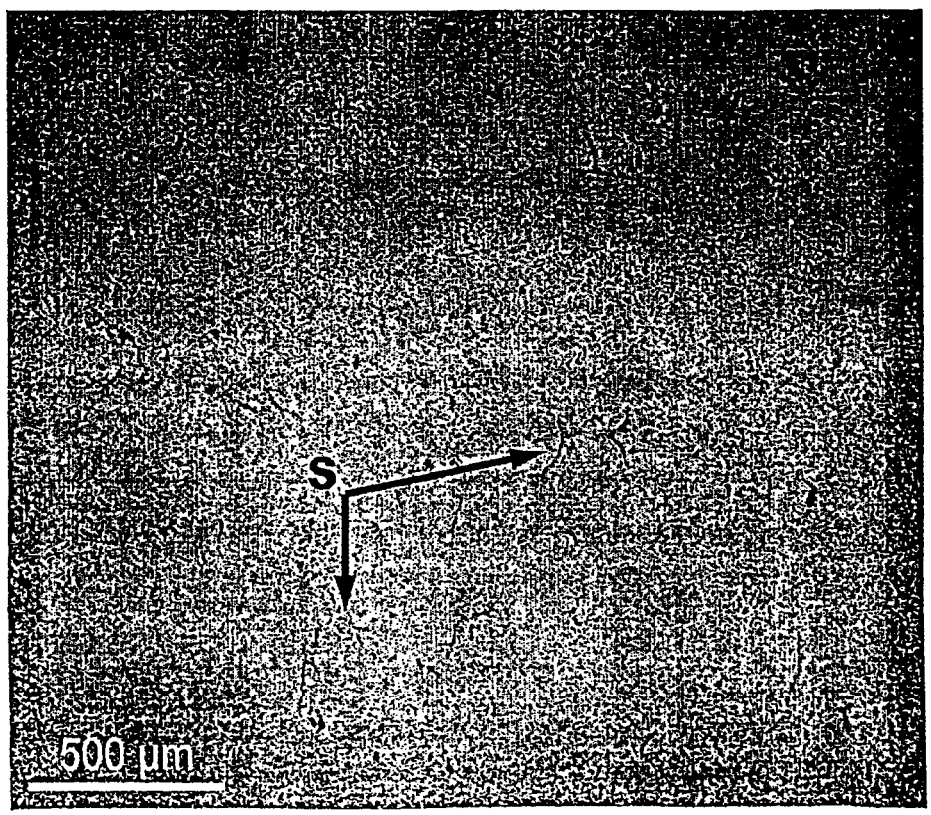
FIG. 2b shows slit-type pores.

Structural composition: compare FIGS. 2a, 2b, with FIG. 2b allowing the split-type pores "S" (in cross-section) to be easily recognised.

Figure 3:
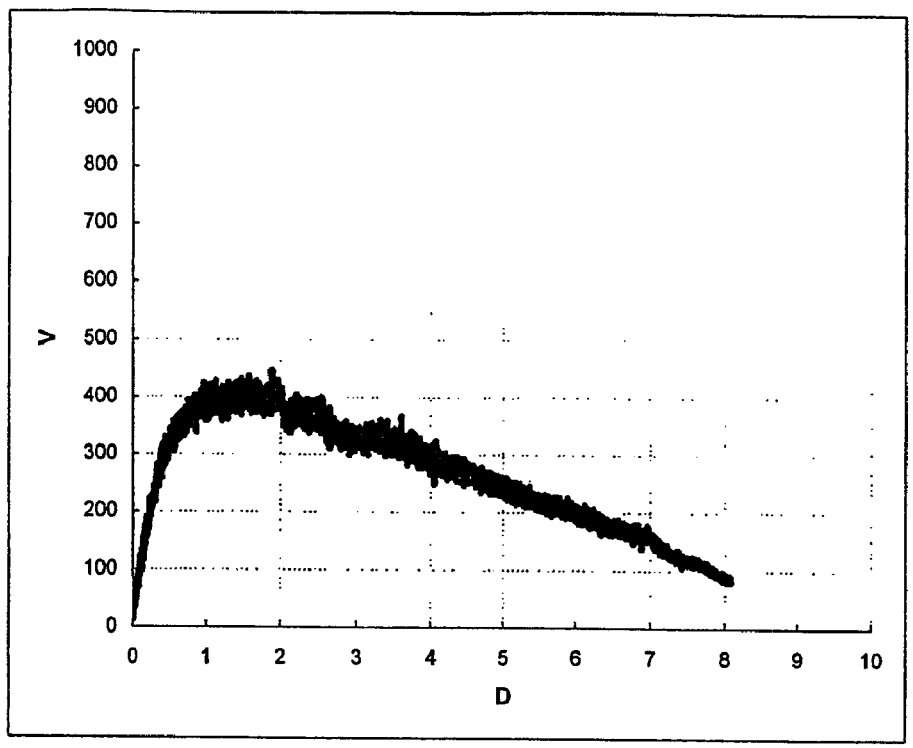
FIG. 3 shows a force/displacement diagram.

Force/displacement diagram (according to wedge split test): compare FIG. 3.

Figure 4:
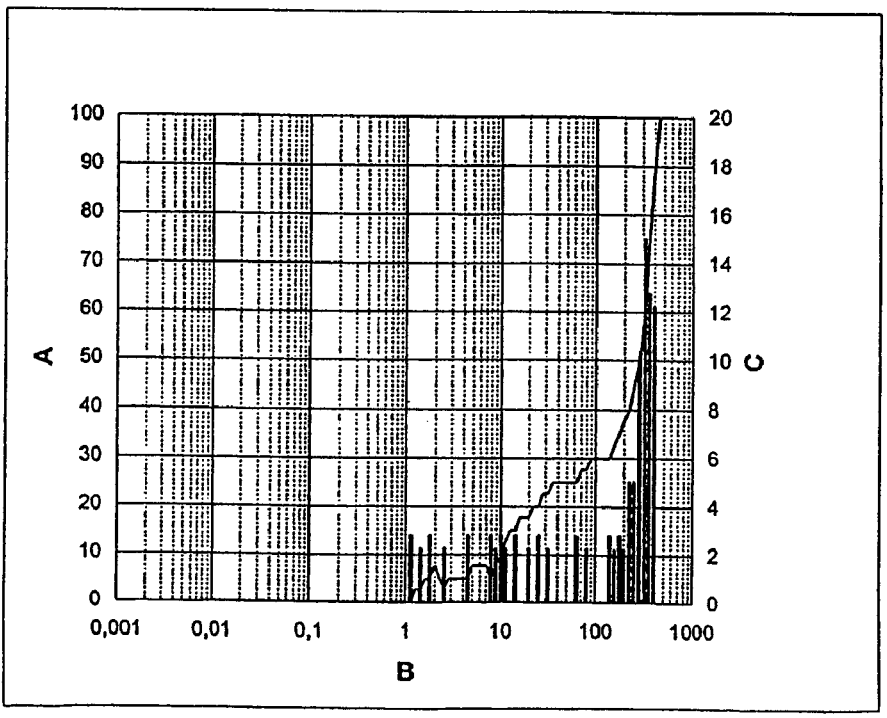
FIG. 4 shows the pore size distribution of a comparative product
Figure 5:
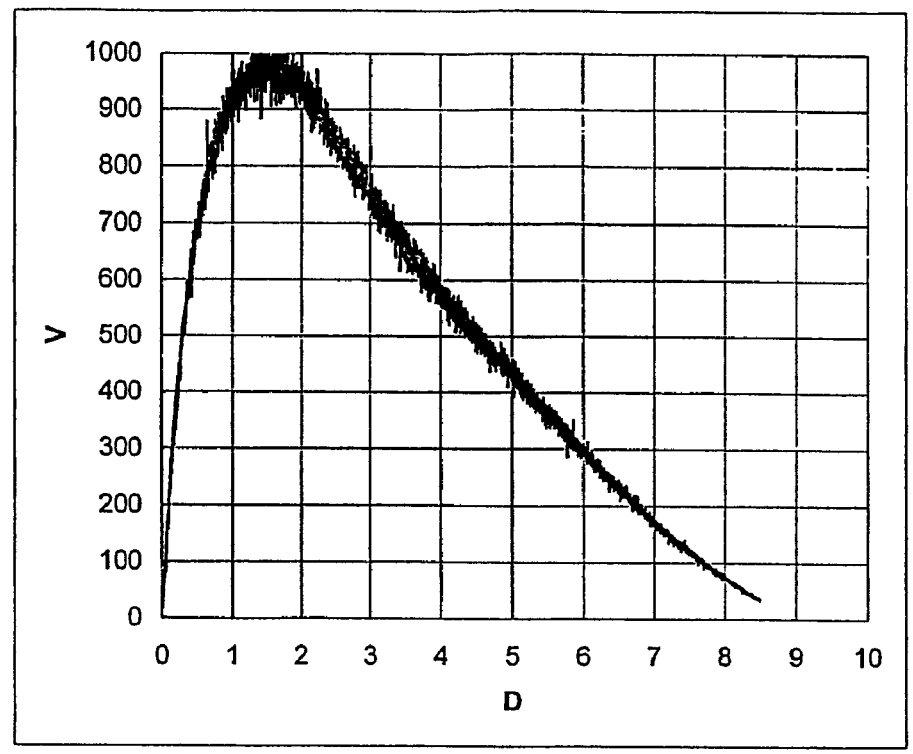
FIG. 5 shows a force/displacement diagram of the comparative product.

FIG. 4 shows the pore size distribution of the comparative product, a convention, known zirconium silicate product and FIG. 5 the corresponding force/displacement diagram.

The distinctly different pore size distribution and the different force/path diagram are conspicuous.

Figure 6A:
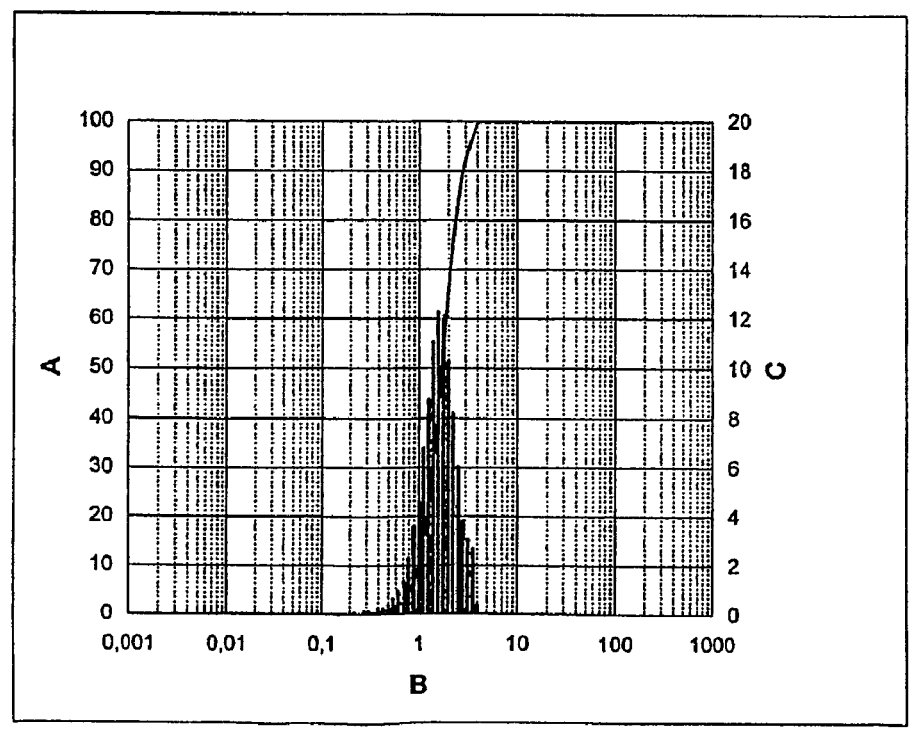
FIGS. 6a and 6b show pore size distribution for products consisting of $Al_2O_3$.
Figure 6B:
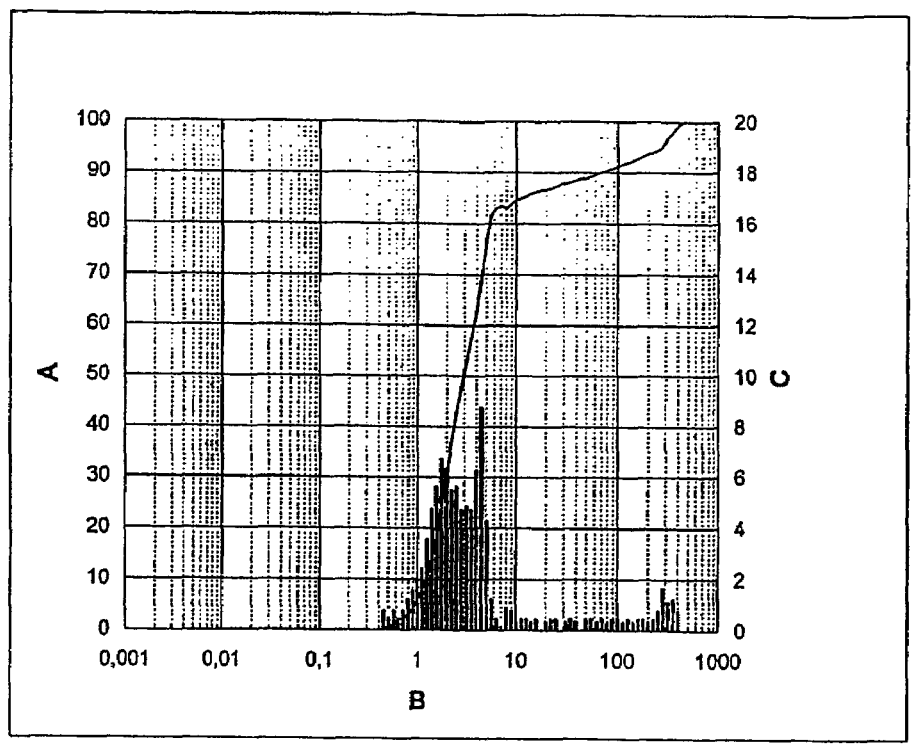
Figure 7:
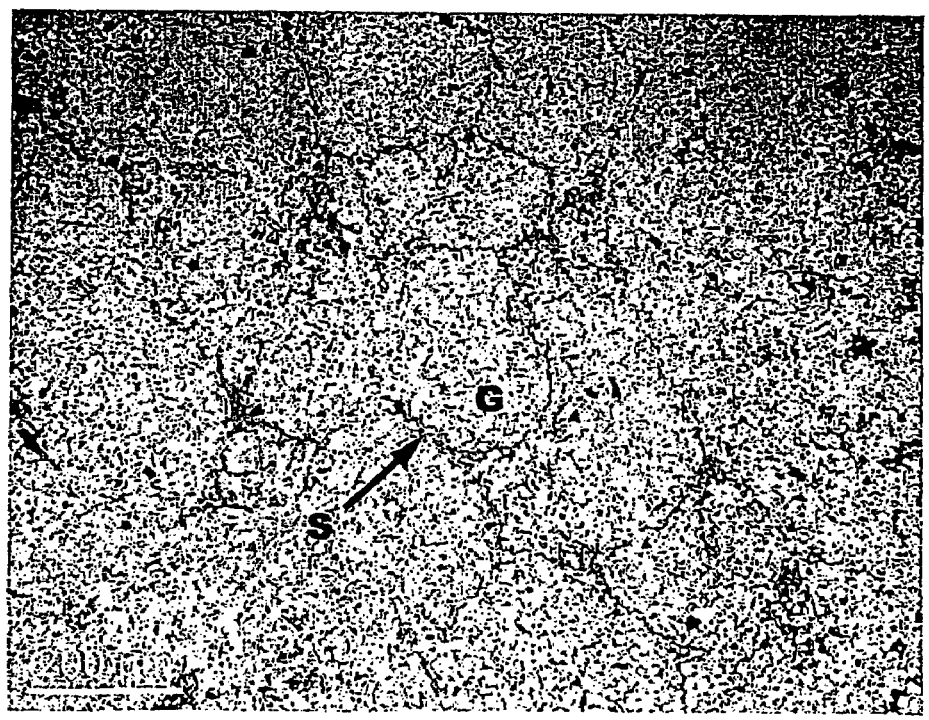
FIG. 7 shows a structure for a product consisting of $Al_2O_3$.

FIG. 6a shows the pore sizes and pore size distribution for a product according to the invention consisting of $Al_2O_3$ which has been obtained from a material in powder form (grain size <100 μm) after granulation (using polyvinyl alcohol as granulating aid) into granules with a diameter of up 5 mm, compressing into a moulded part (compression pressure: 140 MPa) and firing (total firing time: 200 h, including 20 h at $T_{max}=1,720°$ C.). The open overall porosity amounts to 15.8% by volume, the bulk density to 3.2 g/cm³. FIG. 6b shows the pore distribution of an analogous specimen after a holding time of 8 h at max 1,770°. The open overall porosity amounts to 9.1% by volume. In both cases, the specific pore distribution with approximately 60% by volume (FIG. 6a) or approximately 80% by volume can be recognised to be in the region of 0.6-6 μm (FIG. 6a) or 0.8-8 μm (FIG. 6b). FIG. 7 shows the corresponding structure. The granular structure (with outlines of the original granules "G") is still recognisable. Some of the split/surface-type pores between the granules, which were mentioned above, are marked.

Figure 8:
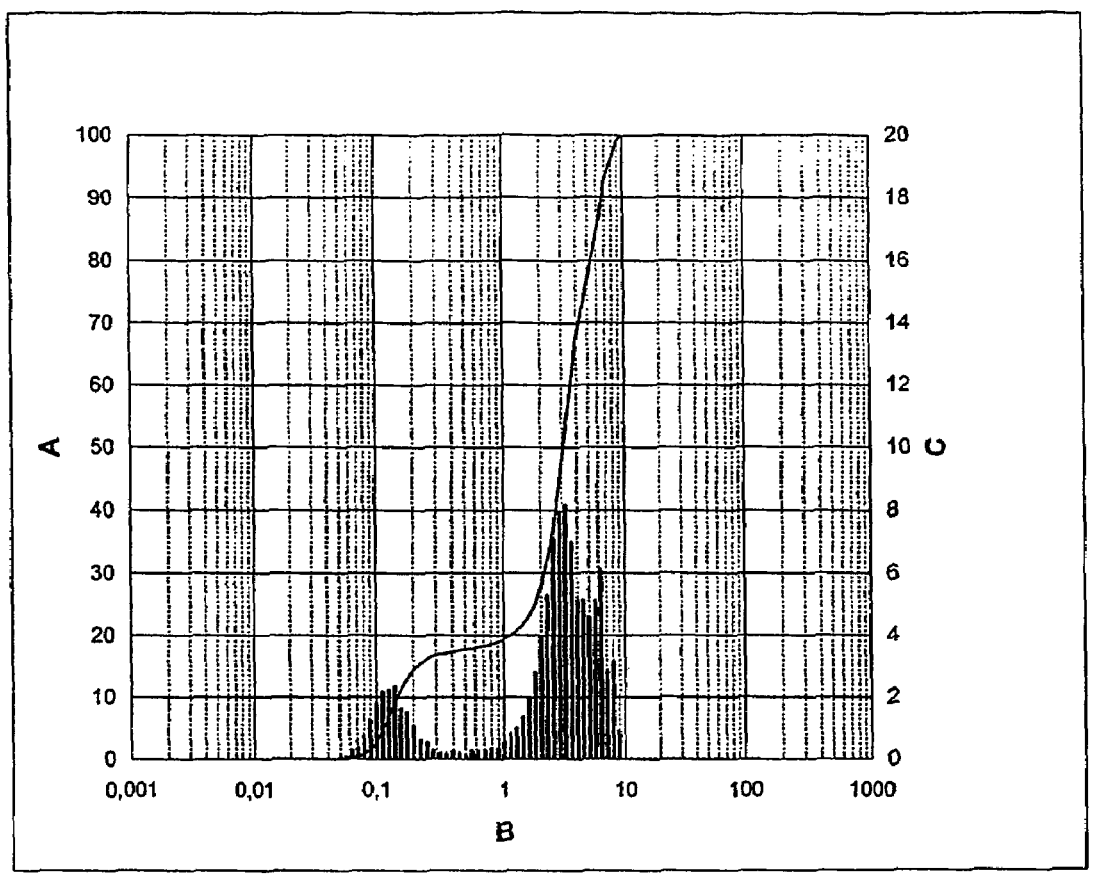
FIG. 8 shows pore size distribution for a product of $Al_2O_3$ and $ZrO_2$.
Figure 9A:
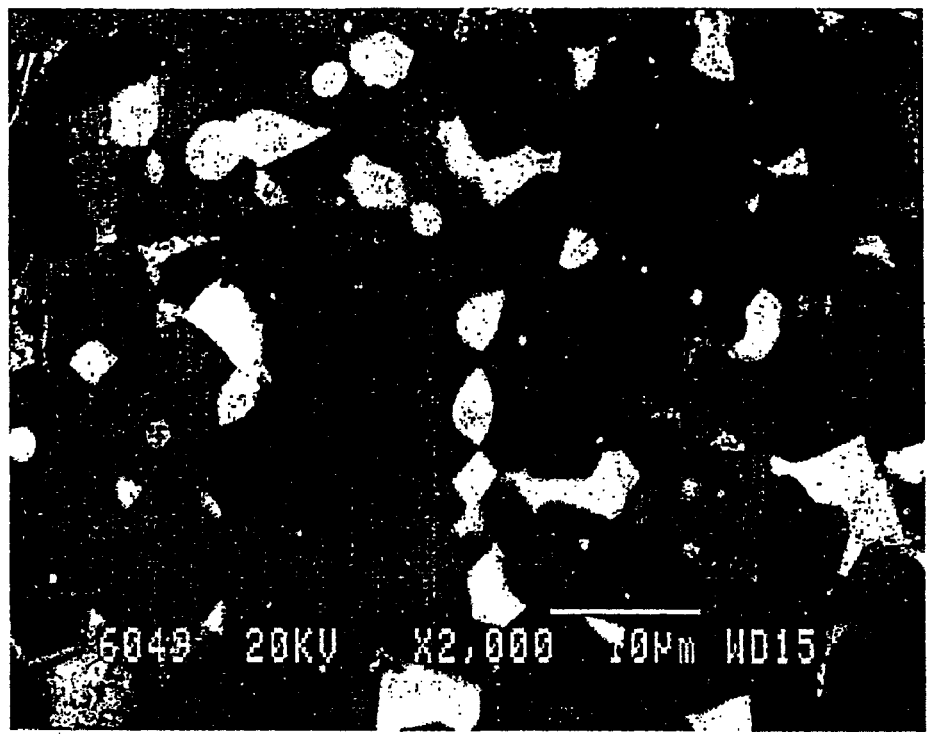
FIGS. 9a and 9b show a structure for a product of $Al_2O_3$ and $ZrO_2$.
Figure 9B:
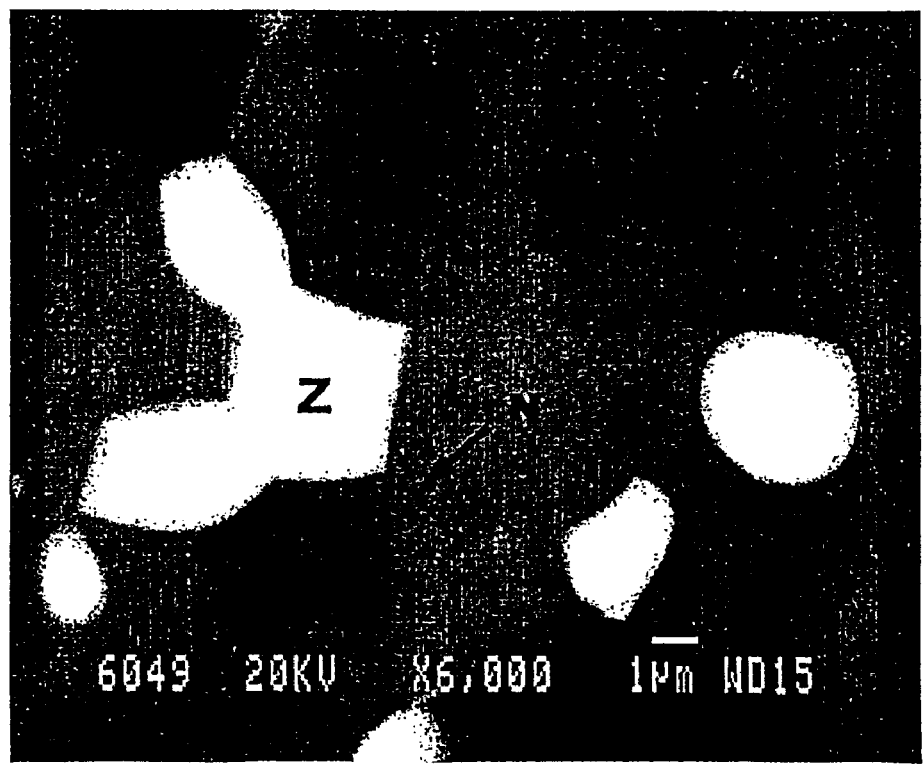

The representation according to FIG. 8 corresponds to the representations in FIG. 6a, b, though in this case for a product of 92% by mass $Al_2O_3$ and 8% by mass $ZrO_2$ after a holding time in the pyroprocess of 20 h (total firing time: 180 h) at maximum 1,720° C. The open total porosity amounts to 11.2% by volume. Apart from the major peak in the distribution curve between 1 and 10 μm, a second peak can be recognised between 0.07 and 0.5 μm which describes the abovementioned nanoporosity. FIG. 9a, b show the corresponding structural images in a 2000 and 6000 fold magnification. The light-coloured particles are the $ZrO_2$ granules ("Z") surrounded by the $Al_2O_3$ matrix ("K"). A pore is indicated by "P". "N" shows a "nanocrack" with a crack width of less than 0.01 μm. The $ZrO_2$ bodies consist partially of individual $ZrO_2$ particles, partially of $ZrO_2$ particles sintered together. The compressive strength in the cold of the product after 30 temperature changes according to DIN 51068, part 1, was above 270 MPa in each case (determined according to DIN EN 993-5). The comparable product according to the state of the art which was produced by the casting process had a compressive strength in the cold (after 30 temperature changes) of 27 MPa.

The compressive strength in the cold (DIN EN 993-5) of the product according to the invention before the temperature treatment was approximately 280 MPa. For comparison: approximately 60 MPa in the case of a comparative product consisting of 99% $Al_2O_3$ with a pore distribution similar to FIG. 4. The flexural strength in the hot according to DIN EN 993-7 at 1,400° C. was 32 MPa, that of the comparative product was 5.5 MPa.

Insofar as data have been provided in the present description regarding the porosity, in particular regarding the pore size, pore size distribution and the total proportion of open porosity, these relate to corresponding definitions and methods of determination according to British Standard BS 1902-3.16: 1990. Measurements by means of mercury pressure porosimmetry according to this standard were carried out using a device of the Micromeritics Auto Pore IV type, 9400 V 105 for an equilibration time of 10 seconds (balancing phase) per pressure stage (pressure level).

Apart from the pore sizes and the pore size distribution, the bulk density was also determined from the open pore volumes obtained from the measurements, as indicated in the standard, such that the density values indicated relate also to this standard.

In FIGS. 1, 4, 6a, 6b and 8, the meaning of the following is: A=relative open porosity, B=pore diameter in μm and C=pore distribution in %.

In FIGS. 3 and 5 which show a force/displacement diagram respectively which was obtained after carrying out the wedge split test at 1,400° C. on the fired product, "V" indicates the vertical load $F_v$, [N] and "D" the vertical displacement $\delta_v$, [mm].

The characteristics disclosed in the claims, description and the figures may be essential for achieving the object both individually and in combination.

The invention claimed is:

1. A fired, fire-resistant ceramic product whose structure
   a) possesses an open porosity of 2-30% by volume, wherein
   b) more than half of the open porosity consisting of pores with each of the pores has a maximum diameter of 15 μm and these pores lie within a pore size interval whose maximum value is less than or equal to 10 times the minimum value, and
   c) is characterised by sintered granule-type structures at the surface of which slit-type pores extend at least partially whose length and width is at least 7 times greater than their height.

2. A product according to claim 1 in which more than half of the open porosity consists of pores with a diameter of $\leq 10$ μm.

3. A product according to claim 1 in which more than half of the open porosity consists of pores with a diameter of $\leq 5$ μm.

4. A product according to claim 1 in which more than half of the open porosity consists of pores with a diameter of $\geq 0.5$ μm.

5. A product according to claim 1 in which more than half of the open porosity consists of pores with a diameter of $\geq 1$ μm.

6. A product according to claim 1 in which more than 60% of the open porosity consists of pores with a diameter of $\leq 10$ μm.

7. A product according to claim 1 in which the pores lie within a pore size interval whose maximum value is less than or equal to 7 times the minimum value.

8. A product according to claim 1 whose open porosity amounts to 2-25% by volume, in particular 5-18% by volume.

9. A product according to claim 1 whose structure consists in an amount of up to >90% by mass of at least one of the following groups of materials:
   a) $ZrSiO_4$
   b) $ZrSiO_4+ZrO_2$
   c) $Al_2O_3$
   d) $Al_2O_3+ZrO_2$
   e) $MgO$
   f) $MgO+Al_2O_3$
   g) $Cr_2O_3+ZrO_2$
   h) $Cr_2O_3$
   i) $Cr_2O_3+TiO_2+ZrO_2$
   j) $Al_2O_3+SiO_2$.

10. A product according to claim 1 whose structure exhibits $ZrO_2$ grains formed in situ during firing.

11. A product according to claim 1 whose structure contains $ZrO_2$ in a monoclinic crystal structure.

12. A product according to claim 1 with a bulk density of >3.2 g/cm$^3$, in particular >3.8 g/cm$^3$.

13. A fired, fire-resistant ceramic product whose structure
   a) possesses an open porosity of 2-30% by volume, wherein
   b) more than half of the open porosity consisting of pores with each of the pores has a maximum diameter of 15 μm and these pores lie within a pore size interval whose maximum value is less than or equal to 10 times the minimum value, and
   c) is characterised by sintered granule-type structures at the surface of which slit-type pores extend at least partially whose length and width is at least 7 times greater than their height and whose slit-type pores make up 5-20% of the open porosity.

* * * * *